US012790165B2

(12) United States Patent
Piironen et al.

(10) Patent No.: US 12,790,165 B2
(45) Date of Patent: Nov. 10, 2026

(54) METHOD OF CONTROLLING SEGREGATION OF TRANSPORTATION INFRASTRUCTURE DATA WITHIN A SHARED DATA NETWORK

(71) Applicant: KONE Corporation, Helsinki (FI)

(72) Inventors: Mikko Piironen, Helsinki (FI); Santtu Koskinen, Helsinki (FI); Anssi Rantamäki, Helsinki (FI); Mikko Heiskanen, Helsinki (FI); Ari Koivisto, Helsinki (FI); Mikko Mattila, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1626 days.

(21) Appl. No.: 17/217,272

(22) Filed: Mar. 30, 2021

(65) Prior Publication Data

US 2021/0218749 A1 Jul. 15, 2021

Related U.S. Application Data

(63) Continuation of application No. PCT/FI2018/050744, filed on Oct. 16, 2018.

(51) Int. Cl.
*B66B 1/34* (2006.01)
*B66B 25/00* (2006.01)
(Continued)

(52) U.S. Cl.
CPC ............ *B66B 1/3453* (2013.01); *B66B 25/00* (2013.01); *H04L 63/08* (2013.01); *H04L 63/102* (2013.01); *H04L 67/12* (2013.01); *H04L 67/30* (2013.01)

(58) Field of Classification Search
CPC ....... B66B 1/3453; B66B 25/00; H04L 63/08; H04L 63/102; H04L 67/12; H04L 67/30
See application file for complete search history.

(56) References Cited

U.S. PATENT DOCUMENTS 6,216,172 B1 4/2001 Kölblin et al.
7,710,587 B2 * 5/2010 Crosier ............... H04L 41/0806 358/1.15
(Continued)

FOREIGN PATENT DOCUMENTS

CN 103647782 B 2/2017
EP 2 258 649 A1 12/2010
(Continued)

OTHER PUBLICATIONS

Cisco, "Connected Rail Solution Design Guide," URL: https://www.cisco.com/c/dam/en_us/solutions/industries/docs/cts-dg.pdf, Nov. 2016, XP055613499, 42 pages total.
(Continued)

*Primary Examiner* — Eduardo Colon Santana
(74) *Attorney, Agent, or Firm* — Birch, Stewart, Kolasch & Birch, LLP

(57) ABSTRACT

A method of controlling segregation of transportation infrastructure control data within a shared data network is disclosed. According to the disclosed method, the data network used for carrying the transportation infrastructure control network may be shared with devices that are not contributing to the elevator functionality. This is achieved using a particular arrangement that allows the use of generic peripheral devices in a transportation infrastructure network without disturbing elevator operations.

20 Claims, 3 Drawing Sheets

(51) Int. Cl.

| | |
|---|---|
| ***H04L 9/40*** | (2022.01) |
| ***H04L 67/12*** | (2022.01) |
| ***H04L 67/30*** | (2022.01) |

(56) References Cited

U.S. PATENT DOCUMENTS

| | | | | |
|---|---|---|---|---|
| 8,151,942 | B2 * | 4/2012 | Rusanen | B66B 1/468 187/247 |
| 8,891,423 | B2 | 11/2014 | Shaheen et al. | |
| 9,537,808 | B1 | 1/2017 | Giansiracusa et al. | |
| 11,975,942 | B2 * | 5/2024 | Troesch | H04W 88/085 |
| 2009/0022131 | A1 | 1/2009 | Rusanen et al. | |
| 2012/0066356 | A1 | 3/2012 | Nguyen et al. | |
| 2012/0145487 | A1 | 6/2012 | Yoo | |
| 2014/0045479 | A1 * | 2/2014 | Shinada | H04W 52/283 455/418 |
| 2015/0358777 | A1 * | 12/2015 | Gupta | H04W 4/70 370/254 |
| 2016/0337181 | A1 | 11/2016 | Cathrow et al. | |
| 2018/0099840 | A1 | 4/2018 | Armistead | |

FOREIGN PATENT DOCUMENTS

| | | | | |
|---|---|---|---|---|
| EP | 2587725 | A1 | 5/2013 | |
| EP | 3 318 523 | A1 | 5/2018 | |
| EP | 2953879 | B1 * | 5/2018 | B66B 1/468 |
| EP | 3 062 541 | A1 | 8/2018 | |
| EP | 3 381 851 | A2 | 10/2018 | |
| EP | 3 381 852 | A2 | 10/2018 | |
| EP | 3146674 | B1 * | 8/2019 | B66B 1/34 |
| WO | WO 2007/061405 | A2 | 5/2007 | |
| WO | WO-2007093665 | A1 * | 8/2007 | B66B 1/468 |
| WO | WO 2010/087815 | A1 | 8/2010 | |
| WO | WO 2012/118711 | A2 | 9/2012 | |
| WO | WO 2014/122357 | A1 | 8/2014 | |
| WO | WO 2015/084396 | A1 | 6/2015 | |
| WO | WO 2015/177020 | A1 | 11/2015 | |
| WO | WO 2018/050654 | A1 | 3/2018 | |
| WO | WO-2020078535 | A1 * | 4/2020 | B66B 1/34 |
| WO | WO-2020079310 | A1 * | 4/2020 | B66B 1/3407 |
| WO | WO-2020079311 | A1 * | 4/2020 | B66B 1/3446 |

OTHER PUBLICATIONS

Cisco, "Understanding Chap authentication," URL: https://www.cisco.com/c/en/us/support/docs/wan/point-to-point-protocol-ppp/25647-understanding-ppp-chap.pdf, Oct. 21, 2015, XP055600402, 10 pages total.

International Search Report for International Application No. PCT/EP2018/078149, dated Mar. 28, 2019.

International Search Report for International Application No. PCT/FI2018/050742, dated Jul. 18, 2019.

International Search Report for International Application No. PCT/FI2018/050743, dated Jul. 5, 2019.

International Search Report for International Application No. PCT/FI2018/050744, dated Sep. 4, 2019.

International Search Report for International Application No. PCT/FI2018/050745, dated Jul. 8, 2019.

International Search Report for International Application No. PCT/FI2018/050746, dated Sep. 24, 2019.

International Search Report for International Application No. PCT/FI2018/050747, dated Jul. 8, 2019.

International Search Report for International Application No. PCT/FI2018/050748, dated Jul. 5, 2019.

Written Opinion of the International Searching Authority for International Application No. PCT/EP2018/078149, dated Mar. 28, 2019.

Written Opinion of the International Searching Authority for International Application No. PCT/FI2018/050742, dated Jul. 18, 2019.

Written Opinion of the International Searching Authority for International Application No. PCT/FI2018/050743, dated Jul. 5, 2019.

Written Opinion of the International Searching Authority for International Application No. PCT/FI2018/050744, dated Sep. 4, 2019.

Written Opinion of the International Searching Authority for International Application No. PCT/FI2018/050745, dated Jul. 8, 2019.

Written Opinion of the International Searching Authority for International Application No. PCT/FI2018/050746, dated Sep. 24, 2019.

Written Opinion of the International Searching Authority for International Application No. PCT/FI2018/050747, dated Jul. 8, 2019.

Written Opinion of the International Searching Authority for International Application No. PCT/FI2018/050748, dated Jul. 5, 2019.

* cited by examiner

METHOD OF CONTROLLING SEGREGATION OF TRANSPORTATION INFRASTRUCTURE DATA WITHIN A SHARED DATA NETWORK

CROSS REFERENCE TO RELATED APPLICATIONS

This application is a Continuation of PCT International Application No. PCT/FI2018/050744, filed on Oct. 16, 2018, which is hereby expressly incorporated by reference into the present application.

DESCRIPTION OF BACKGROUND

The following description relates transportation infrastructure within buildings and public places. More particularly the application relates to elevators and escalators. and allowing the use of generic peripheral devices in a transportation infrastructure control network.

Modern elevators are network connected devices that can be accessing resources from one or more external entities providing services to elevators and escalators for the benefit of passengers. In addition to the improvement of passenger comfort and efficiency, the network connectivity may be used for several other purposes, for example entertainment or data collection.

A common approach for providing network connectivity is to use specially designed dedicated network technologies that are configured to reliably and timely provide safety and elevator control related messages to the receiving network components. In many occasions these special purpose dedicated networks use technologies that are compatible with old cables and old technology of elevators. Special purpose dedicated networks have been easy to configure and maintain. Thus, they have been preferred solutions and under continuous development.

Nowadays the network connectivity does not only relate to external devices connected to an elevator system. Even some components that are relevant or even essential for normal operation of an elevator or escalator group can be connected using data communication networks.

In this description, these components are referred to as applications. The applications may be implemented as hardware or software. Many applications involving hardware also include software, and software applications may be executed in a server or central computing resource. Thus, an application can be described as an entity providing services to requesting clients. An example of an application is a group controller. An example of a client is a destination operating panel installed in an elevator arrangement.

Current elevators use a network arrangement that is in this description referred to as a Transportation infrastructure network (TICN). A TICN can be a combination of wired and wireless network solutions.

The TICN is used for connecting elevator and escalator components together. Particularly, they are used for connecting Elevator Escalator Peripheral Devices (EEPD) to the elevator arrangement. When new peripheral devices, which are here discussed as an example of client entities, are added to the elevator or escalator arrangement, the peripheral devices must be detected and connected to the network appropriately. The same applies when already existing peripheral devices need to be disconnected and then reconnected to the arrangement. Further needs may arise from other possible reorganizing related tasks.

In addition to applications and elevator/escalator peripheral devices, also external devices and generic peripheral devices may be attached to the transportation infrastructure control network. A generic peripheral device is understood to be a peripheral device of more general nature. Generic peripheral devices are typically sold to several different purposes and are not intended to elevator and escalator environments only. Examples of generic peripheral devices include display units, speaker arrangements, wireless network base stations and other similar components.

As discussed above, attaching peripheral devices and other devices to a TICN may require a complicated configuration process. Conventionally, the configuration process has been made easier by using pre-configured devices; however, in modern elevator arrangements this is a difficult task as the elevator system may be a part of a building network that is complicated and continuously changed. Furthermore, these devices are commonly installed in spaces with limited access. An example of such limited space is the elevator shaft. Typically, working in elevator shafts requires a special qualification for elevator environment.

When networks are built into modern buildings, the number of network elements, such as switches, may be very high. For example, it is possible that each elevator shaft has a network switch or router on each landing floor level. These network switches form a complicated network topology. Thus, there is a need for configuring these network elements that provide a base for a TICN.

SUMMARY

A method of controlling segregation of elevator and escalator control data within a shared data network is disclosed. According to the disclosed method, the data network used for carrying the transportation infrastructure control network may be shared with devices that are not contributing to the elevator functionality. This is achieved using a particular arrangement that allows the use of generic peripheral devices in a transportation infrastructure network without disturbing elevator operations.

In an aspect a method for connecting a generic peripheral device to a transportation infrastructure control network, wherein the generic peripheral device is connected to the transportation infrastructure control network controller through a network element, is disclosed. The method comprises receiving an indication of attaching of a peripheral device; selecting a profile from a set of predetermined profiles for the attached peripheral device; and instructing the network element to assign the selected profile to the generic peripheral device.

A benefit of the method described above is that it provides a possibility to share a data communication network arrangement that has been constructed for an elevator or escalator. This may remove a need to construct another building network, so that resources are saved, and also complicated operations on buildings are avoided. Furthermore, this provides an easy access point for all kinds of devices in such a manner that elevators and escalators are not disturbed. Even if the transportation infrastructure control network only forms a part of the overall building network, the method according to the aspect is beneficial as it reduces operating and construction costs.

In an implementation the method further comprises sending an authentication request to the peripheral device; receiving a response to the authentication request. It is beneficial to use authentication in the method so that only authorized devices may be connected.

In an implementation the network element is a switch. It is beneficial to configure the switches of a network using the method as described above, as it provides an efficient way of configuring a network consisting of several switches.

In an implementation the method further comprises determining the set of predetermined profiles. It is beneficial to determine a set of profiles that can be assigned to different types of peripheral devices, so that the peripheral devices get enough network capacity in order to work, and also so that the information security of the network can be maintained.

In an implementation the method further comprises generating a set of communication rules in accordance with the set of predetermined profiles. It is beneficial to use rules determined in accordance with the profiles, so that the profiles get enough network capacity and are allowed only to use the network capacity needed for the device in order to maximize the overall capacity of the network.

In an implementation the method further comprises transmitting a set of communication rules to each network element in the transportation infrastructure control network. It is beneficial to distribute the communication rules to the network using network elements, such as switches, so that the network elements will know how to transmit the data in the network.

In an aspect a computer program comprising computer executable computer program code is disclosed. The computer program code is configured to perform a method described above when the computer program is executed in a computing device. It is beneficial to implement the method as computer software, so that it can be provided to various types of network controllers.

In an aspect a transportation infrastructure control network controller is disclosed. The elevator and network controller comprises at least one processor configured to execute computer program code; at least one memory configured to store computer programs and related data; at least one network interface configured to connect the transportation infrastructure control network controller with at least one network element. The transportation infrastructure control network controller is configured to perform a method as described above.

A benefit of the aspect described above is that it provides a possibility to share a data communication network arrangement that has been constructed for an elevator or escalator. This may remove a need to construct another building network, so that resources are saved, and also complicated operations on buildings are avoided. Furthermore, this provides an easy access point for all kinds of devices in such a manner that elevators and escalators are not disturbed. Even if the transportation infrastructure control network only forms a part of the overall building network, the network controller according to the aspect is beneficial as it reduces operating and construction costs.

In an aspect an elevator and escalator arrangement is disclosed, comprising a transportation infrastructure control network comprising a transportation infrastructure control network controller as described above. It is beneficial to use the transportation infrastructure control network controller as described above for providing the networks to elevator and escalator installations.

In an implementation the arrangement further comprises at least one network element and at least one generic peripheral device. It is beneficial that the arrangement according to the implementation can use different types of components connected to the network.

The methods, devices and systems discussed above are beneficial, as they increase the possibility to use an existing transportation infrastructure network for providing network connectivity to a building which does not otherwise have an adequate network infrastructure. In a new building, it reduces costs by removing a need to build two different networks for the building.

BRIEF DESCRIPTION OF THE DRAWINGS

The accompanying drawings, which are included to provide a further understanding of the method of controlling segregation of elevator/escalator control data within a shared data network and constitute a part of this specification, illustrate example embodiments and together with the description help to explain the principles of the method of controlling segregation of elevator/escalator control data within a shared data network. In the drawings.

DETAILED DESCRIPTION

Reference will now be made in detail to the embodiments, examples of which are illustrated in the accompanying drawings.

In the following description, an elevator is used as an example. The arrangement is also suitable for escalators and systems comprising both elevators and escalators.

Figure 1:
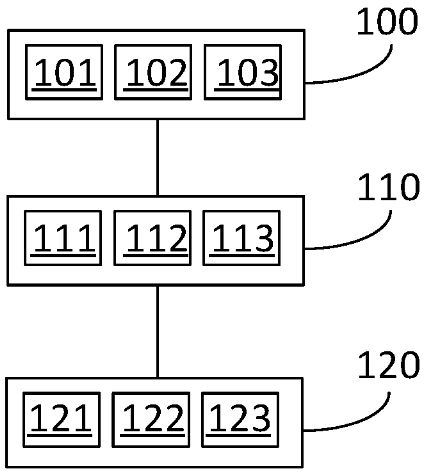
FIG. 1 is a block diagram of an example network used in an elevator and escalator environment.

In FIG. 1 a block diagram of an example network arrangement that can be used in an elevator and escalator environment is shown. FIG. 1 is used for providing a better understanding of how the method explained below can be implemented. FIG. 1 shows a network controller 100, a network element 110 and a peripheral device 120. The network controller 100 is a controller device that is configured to control the elevator and/or escalator network. The controller is responsible for providing access rights, configuration settings and the like. The network controller may be one device, or it may be divided into a plurality of devices.

The network element 110 may be a switch to which a peripheral device 120 is attached. The network element 110 is configured to route data communication between a peripheral device and a network controller. In FIG. 1, only one network element is shown; however, commonly a plurality of network elements are connected to one network controller. Accordingly, it is common that a plurality of peripheral devices are connected to network elements. The peripheral device 120 connected to the network controller 100 in this example is a generic peripheral device. A generic peripheral device is a device that is connected to a TICN, but it does not have a functionality directly related to the elevator/escalator control. An example of such generic peripheral devices is an additional display. It is also possible that the generic peripheral device may be used for connecting further devices. In such a case the generic peripheral device may be, for example, a wireless local area network base station that is configured to provide limited or full internet access to devices in the vicinity of the base station.

The network controller 100 comprises at least one processor 101, at least one memory 102 and at least one network connection interface 103. The at least one processor 101 is configured to execute computer programs that are used to implement the method described below. The at least one memory 102 may comprise volatile and non-volatile portions, and is configured to store computer programs and related data. The network connection interface 103 is used to connect network elements to the controller, and also possibly to connect the controller to the internet.

The network element 110 comprises at least one processor 111, at least one memory 112 and at least one network connection interface 113. The at least one processor 111 is configured to execute computer programs that are used to implement the method described below. The at least one memory 112 may comprise volatile and non-volatile portions, and is configured to store computer programs and related data. The network connection interface 113 is used to connect peripheral devices to the controller through the network element 110.

The generic peripheral device 120 comprises at least one processor 121, at least one memory 122 and at least one network connection interface 123. The at least one processor 121 is configured to execute computer programs that are used to implement the method described below. The at least one memory 122 may comprise volatile and non-volatile portions, and is configured to store computer programs and related data. The network connection interface 123 is used to connect the peripheral device to the controller, and also possibly to other devices connected to the peripheral device.

Figure 2:
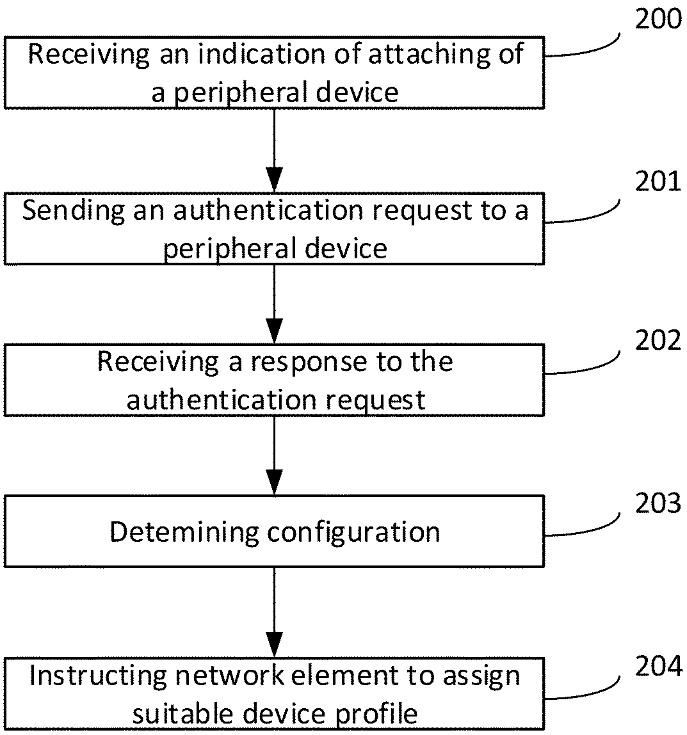
FIG. 2 is a flow chart of an example method.
Figure 3:
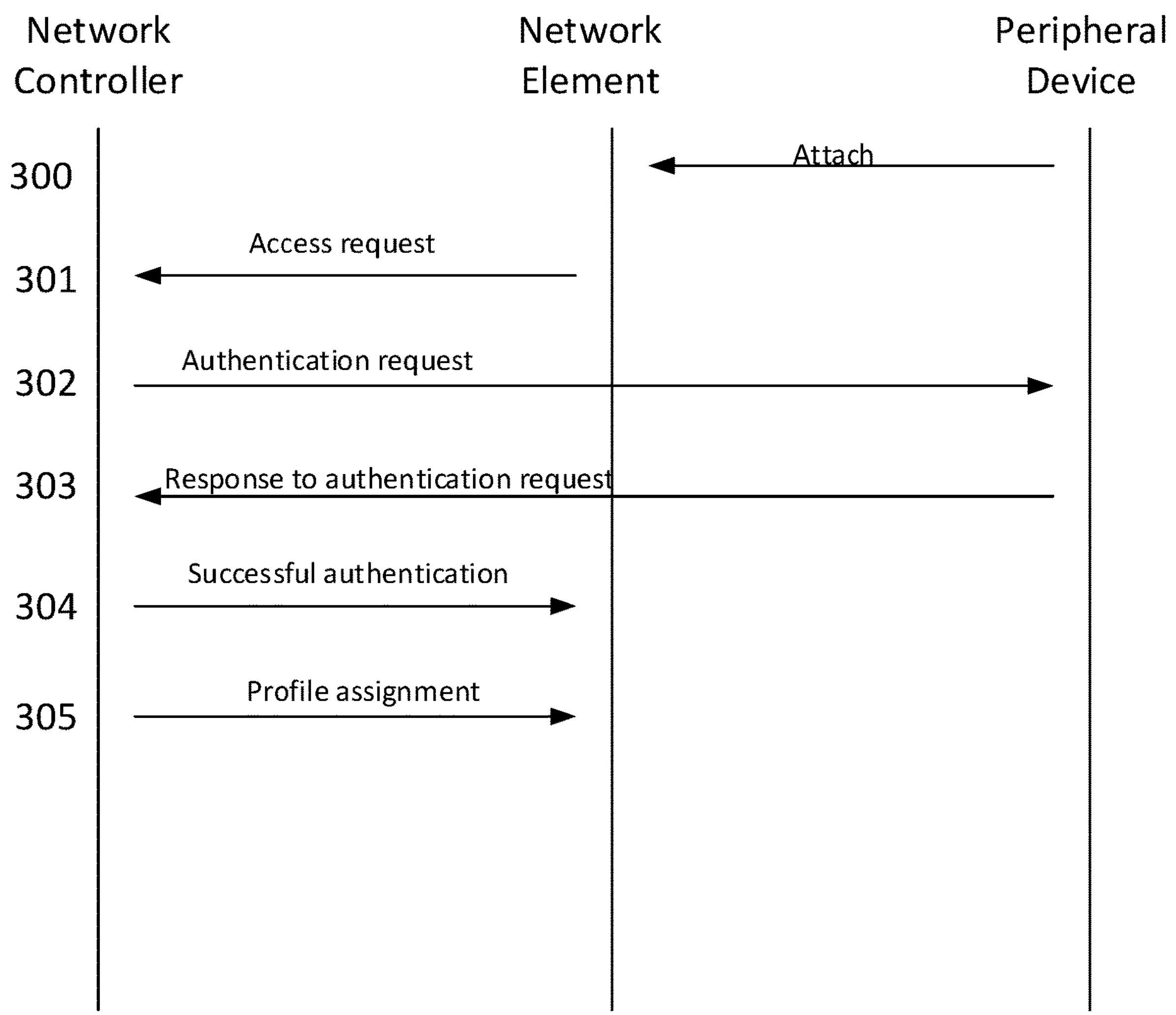
FIG. 3 is a signaling chart according to an example.

In FIGS. 2 and 3, a method and signaling are shown. These figures do not include the preparatory steps that are described in the following. When a peripheral device is attached to the transportation infrastructure control network, a profile is assigned to the device. The profile may be particularly designed for the attached peripheral device, or it may be selected from a set of predetermined profiles that are generic for all peripheral devices. These profiles determine, for example, the priority of data transmissions, the maximum bandwidth associated with the peripheral device, and other quality of service related matters. In addition to the quality of service, the profile may include a data security related configuration, for example which other devices the peripheral device may communicate with. For example, if the peripheral device is an elevator/escalator peripheral device, it may be granted a high priority and access to only communicate with other elevator/escalator peripheral devices and the network controller. If the peripheral device is a generic peripheral device, such as the device of FIG. 1, the generic peripheral device may be granted a lower priority and a connection only to the internet, and possibly to other generic peripheral devices. This prevents communication with the elevator/escalator peripheral devices and increases the security.

The profiles are associated with rules determining the functionality described above. Thus, the preliminary preparations include creating a list of communication controlling rules for the network elements of the TICN. This set of rules is based on a desired communication matrix between peripherals and resources in the network. The rules define which types of connected peripherals can communicate with each other, and which network resources they can access. The rules can also implement classification and prioritization of traffic related to each type of peripheral devices. These rules are distributed to the network elements of the TICN as part of the network commissioning.

In FIG. 2 an example of a method of controlling segregation of elevator/escalator control data within a shared data network is shown. The method is initiated by receiving, at the network controller, an indication that a peripheral device, such as the generic peripheral device of FIG. 1, is attached to a network element that is further connected to a network controller, step 200. The indication is received at the network controller through a network element. Thus, the indication may already comprise additional tasks, such as an access request. The indication of attaching may be generated automatically or manually.

After receiving the indication, the network controller sends an authentication request to the peripheral device, step 201. The peripheral device responds to the authentication request, step 202. When the authentication has been received, it is possible to determine a correct profile for the attached generic peripheral device, step 203. The correct profile has been associated with an appropriate network configuration, for example routing rules that are transmitted to the network element responsible for communicating with the attached generic peripheral device, step 204.

FIG. 3 is a signaling chart providing a better understanding of the arrangement and the method discussed above. The signaling starts with an indication of an attachment signal, 300. This is generated when a generic peripheral device is connected to a network element, and the generic peripheral device wishes to gain connectivity, for example to the internet or to other peripheral devices. The network element to which the generic peripheral device is connected generates an access request signal 301 to the network controller.

The network controller receives the access request. As a response it will perform an authentication of the attached generic peripheral device, and transmits an authentication request signal, 302. Then the generic peripheral device generates a response signal 303 to the authentication request. When the authentication is successful, an acknowledgement signal of a successful authentication 304 is generated and sent to the network element, so that the generic peripheral device is connected to the network. Lastly, a profile assignment and other routing rules are sent to the network element, 305.

The above described methods may be implemented as computer software which is executed in a computing device that can be connected to a data communication network. When the software is executed in a computing device, it is configured to perform the above described inventive method. The software is embodied on a computer readable medium, so that it can be provided to the computing device, such as the transportation infrastructure control network controller of FIG. 1.

As stated above, the components of the exemplary embodiments can include a computer readable medium or memories for holding instructions programmed according to the teachings of the present embodiments and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the method of controlling segregation of elevator/escalator control data within a shared data network may be implemented in various ways. The method of controlling segregation of elevator/escalator control data within a shared data network and its embodiments are thus not limited to the examples described above; instead they may vary within the scope of the claims.

The invention claimed is:

1. A method for connecting a generic peripheral device to a transportation infrastructure control network, which method comprises:

receiving, by a network controller comprising at least one processor, at least one memory and at least one network interface, an indication of attaching of a peripheral device to the transportation infrastructure control network, the peripheral device being connected to the transportation infrastructure control network controller through a network element;

selecting, by the network controller, a profile for the generic peripheral device from a set of predetermined profiles for the attached peripheral device, each of the set of predetermined profiles having rules for communication among connected devices in the transportation infrastructure control network; and instructing, by the network controller via the at least one network interface, the network element to assign the selected profile for the generic peripheral device to the peripheral device.

2. The method according to claim 1, wherein the method further comprises:

sending an authentication request to the peripheral device; and receiving a response to the authentication request.

3. The method according to claim 2, wherein the network element is one of the following: a switch, a router and a wireless access point.

4. The method according to claim 2, wherein the method further comprises determining the set of predetermined profiles.

5. The method according to claim 2, wherein the method further comprises generating a set of communication rules in accordance with the set of predetermined profiles.

6. The method according to claim 2, wherein in the method further comprises transmitting a set of communication rules to one or more network elements in the transportation infrastructure control network.

7. The method according to claim 1, wherein the network element is one of the following: a switch, a router and a wireless access point.

8. The method according to claim 7, wherein the method further comprises determining the set of predetermined profiles.

9. The method according to claim 7, wherein the method further comprises generating a set of communication rules in accordance with the set of predetermined profiles.

10. The method according to claim 7, wherein in the method further comprises transmitting a set of communication rules to one or more network elements in the transportation infrastructure control network.

11. The method according to claim 1, wherein the method further comprises determining the set of predetermined profiles.

12. The method according to claim 11, wherein the method further comprises generating a set of communication rules in accordance with the set of predetermined profiles.

13. The method according to claim 11, wherein in the method further comprises transmitting a set of communication rules to one or more network elements in the transportation infrastructure control network.

14. The method according to claim 1, wherein the method further comprises generating a set of communication rules in accordance with the set of predetermined profiles.

15. The method according to claim 14, wherein in the method further comprises transmitting a set of communication rules to one or more network elements in the transportation infrastructure control network.

16. The method according to claim 1, wherein in the method further comprises transmitting a set of communication rules to one or more network elements in the transportation infrastructure control network.

17. A non-transitory computer readable medium including instructions stored thereon which when executed by a network controller cause the network controller to:

receive, by the network controller comprising at least one processor, at least one memory and at least one network interface, an indication of attaching of a peripheral device to a transportation infrastructure control network, the peripheral device being connected to the transportation infrastructure control network controller through a network element;

select, by the network controller, a profile for the generic peripheral device from a set of predetermined profiles for the attached peripheral device, each of the set of predetermined profiles having rules for communication among connected devices in the transportation infrastructure control network; and instruct, by the network controller via the at least one network interface, the network element to assign the selected profile for the generic peripheral device to the peripheral device.

18. A transportation infrastructure control network controller comprising:

at least one memory configured to store instructions thereon;

at least one network interface configured to connect the transportation infrastructure control network controller with at least one network element;

at least one processor configured to execute the instruction to:

receive, by the network controller, an indication of attaching of a peripheral device to the transportation infrastructure control network, the peripheral device being connected to the transportation infrastructure control network controller through a network element;

select, by the network controller, a profile for the generic peripheral device from a set of predetermined profiles for the attached peripheral device, each of the set of predetermined profiles having rules for communication among connected devices in the transportation infrastructure control network; and instruct, by the network controller via the at least one network interface, the network element to assign the selected profile for the generic peripheral device to the peripheral device.

19. An elevator and escalator arrangement comprising a transportation infrastructure control network comprising the transportation infrastructure control network controller according to claim 18.

20. The elevator and escalator arrangement according to claim 19, wherein the arrangement further comprises at least one network element and at least one generic peripheral device.

* * * * *